US 8,346,261 B2

(12) United States Patent
Iwamura et al.

(10) Patent No.: US 8,346,261 B2
(45) Date of Patent: Jan. 1, 2013

(54) MOBILE COMMUNICATION METHOD AND SWITCHING CENTER

(75) Inventors: Mikio Iwamura, Yokohama (JP);
Minami Ishii, Yokohama (JP); Alf Zugenmaier, Munich (DE)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 12/989,801

(22) PCT Filed: Oct. 22, 2009

(86) PCT No.: PCT/JP2009/068176
§ 371 (c)(1),
(2), (4) Date: Jan. 21, 2011

(87) PCT Pub. No.: WO2010/047367
PCT Pub. Date: Apr. 29, 2010

(65) Prior Publication Data
US 2011/0111731 A1    May 12, 2011

(30) Foreign Application Priority Data
Oct. 22, 2008   (JP) .................... 2008-272517

(51) Int. Cl.
*H04W 36/00* (2009.01)
(52) U.S. Cl. ........ 455/436; 380/270; 380/271; 380/272; 380/273
(58) Field of Classification Search .................. 455/436; 380/270–273
See application file for complete search history.

(56) References Cited

U.S. PATENT DOCUMENTS

| 2008/0095362 | A1* | 4/2008 | Blom et al. ..................... 380/45 |
| 2009/0209259 | A1* | 8/2009 | Brusilovsky et al. .......... 455/438 |
| 2009/0220087 | A1* | 9/2009 | Brusilovsky et al. .......... 380/272 |
| 2009/0275309 | A1* | 11/2009 | He ................................. 455/410 |
| 2010/0002883 | A1* | 1/2010 | Sammour et al. ............. 380/272 |
| 2010/0056156 | A1* | 3/2010 | Xu et al. ....................... 455/436 |
| 2010/0130207 | A1* | 5/2010 | Wu ................................ 455/436 |

FOREIGN PATENT DOCUMENTS
EP    1 841 267 A2    10/2007

(Continued)

OTHER PUBLICATIONS

Extended European Search Report for Application No. 09822064.3 dated Apr. 14, 2011 (6 pages).

(Continued)

*Primary Examiner* — Charles Appiah
*Assistant Examiner* — Mazda Sabouri
(74) *Attorney, Agent, or Firm* — Osha Liang LLP

(57) ABSTRACT

In a procedure for a mobile station (UE) to perform handover from a cell under the control of a radio base station (NB) of an UTRAN scheme to a cell under the control of a radio base station (eNB) of an E-UTRA scheme, a switching center (MME) of the E-UTRA scheme receives, from and the radio base station (eNB) of the E-UTRA scheme, a handover request acknowledge message including a transparent container including a security algorithm of an AS used in a communication between the mobile station (UE) and the radio base station (eNB) of the E-UTRA scheme; and the switching center (MME) of the E-UTRA scheme transmits, to a switching center (SGSN) of the UTRA scheme, a NAS PDU including the transparent container, a security algorithm of a NAS and a security processing parameter of the NAS.

4 Claims, 7 Drawing Sheets

FOREIGN PATENT DOCUMENTS

| | | |
|---|---|---|
| JP | 2003-516000 A | 5/2003 |
| JP | 2006-332788 A | 12/2006 |
| JP | 2007-515827 A | 6/2007 |
| WO | 01/39538 A1 | 5/2001 |
| WO | 2005/027557 A1 | 3/2005 |
| WO | WO 2008/138273 * | 11/2008 |

OTHER PUBLICATIONS

3GPP TS 33.401 V1.1.0, Apr. 2008, "Technical Specification Group Services and System Aspects; 3GPP System Architecture Evolution: Security Architecture," 45 pages.

3GPP TR 33.821 V0.8.0, Apr. 2008, "Technical Specification Group Services and System Aspects; Rationale amd track of security decisions in Long Term Evolution (LTE) RAN/ 3GPP System Architecture Evolution (SAE)," 130 pages.

International Search Report w/translation from PCT/JP2009/068176 dated Nov. 24, 2009 (5 pages).

Written Opinion from PCT/JP2009/068176 dated Nov. 24, 2009 (3 pages).

Office Action for Australian Patent Application No. 2009307353 issued Aug. 24, 2012 (4 pages).

* cited by examiner

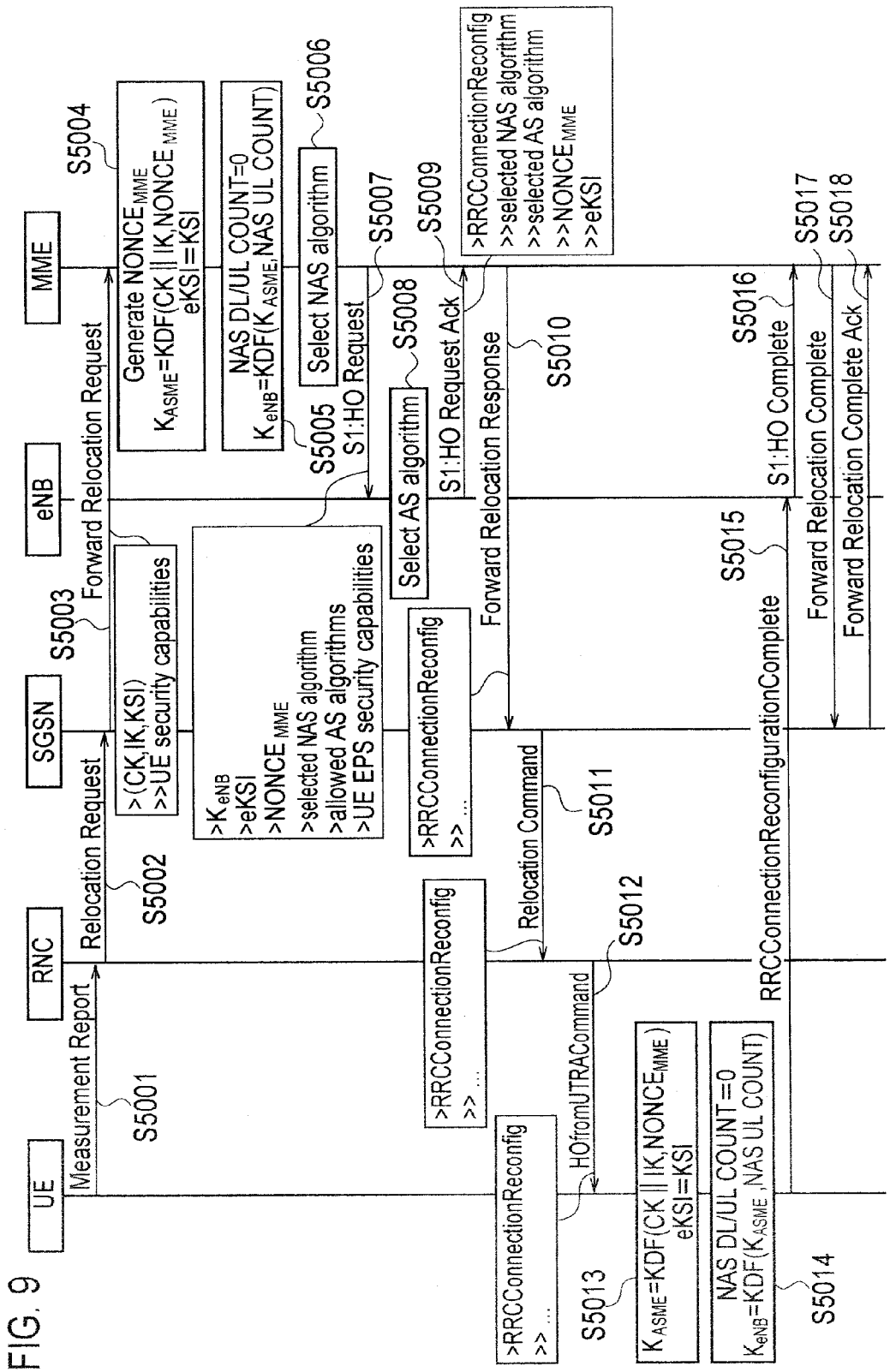

MOBILE COMMUNICATION METHOD AND SWITCHING CENTER

TECHNICAL FIELD

The present invention relates to a mobile communication method and a switching center.

BACKGROUND ART

Presently, study is being made by the 3GPP on a mobile communication system in which a radio access network of a UTRA (Universal Terrestrial Radio Access) scheme and a radio access network of an E-UTRA (Evolved Universal Terrestrial Radio Access) scheme are mixed.

In such mobile communication system, the mobile station UE is assumed to perform handover between a cell under the control of a radio base station of the UTRA scheme and a cell under the control of a radio base station of the E-UTRA scheme.

DISCLOSURE OF THE INVENTION

Summary of the Invention

Problem to be Solved by the Invention

Here, the mobile station UE is configured to perform different security processings in a communication performed within a cell under the control of a radio base station of the UTRA scheme and in a communication performed within a cell the under the control of a radio base station of the E-UTRA scheme.

However, in the mobile communication system described above, there is a problem that how security-related information used in a communication before handover should be carried over to a communication after handover when a mobile station UE performs handover between a cell under the control of a radio base station of the UTRA scheme and a cell under the control of a radio base station of the E-UTRA scheme is not clearly defined.

Thus, the present invention is made in view of the above and an object of the present invention is to provide a mobile communication method and a switching center with which security-related information used in a communication before handover can be appropriately carried over to a communication after handover in a handover process, which is performed by the mobile station UE, from a first cell under the control of a radio base station of a first radio access scheme to a second cell under the control of a radio base station of a second radio access scheme.

Means for Solving the Problem

A first aspect of the present invention is summarized as a mobile communication method, in a procedure for a mobile station to perform handover from a first cell under the control of a radio base station of a first radio access scheme to a second cell under the control of a radio base station of a second radio access scheme, the mobile communication method including the steps of: (A) selecting, at a switching center of the second radio access scheme, a security processing algorithm of a first protocol used in a communication between the mobile station and the switching center of the second radio access scheme; (B) generating, at the switching center of the second radio access scheme, a security processing parameter of the first protocol; (C) receiving, at the switching center of the second radio access scheme from the radio base station of the second radio access scheme, a handover request acknowledge message including a transparent container including a security algorithm of a second protocol used in a communication between the mobile station and the radio base station of the second radio access scheme; (D) transmitting, from the switching center of the second radio access scheme to a switching center of the first radio access scheme, a first message including the transparent container, the security processing algorithm of the first protocol and the security processing parameter of the first protocol; (E) receiving, at the mobile station in the first cell, the transparent container, the security processing algorithm of the first protocol and the security processing parameter of the first protocol; (F) calculating, at the mobile station, a security processing parameter of the second protocol, by using the security processing algorithm of the first protocol and the security processing parameter of the first protocol; (G) performing, at the mobile station in the second cell, security processing in a communication using the first protocol, by using the security processing algorithm of the first protocol and the security processing parameter of the first protocol; and (H) performing, at the mobile station in the second cell, security processing in a communication using the second protocol, by using the security processing algorithm of the second protocol and the security processing parameter of the second protocol.

In the first aspect, in the step (D), a message for the first protocol including the security processing algorithm of the first protocol and the security processing parameter of the first protocol can be included into the transparent container and can be transmitted.

In the first aspect, in the step (D), the switching center of the second radio access scheme can include a message for the first protocol including the security processing algorithm of the first protocol and the security processing parameter of the first protocol into the first message, and to transmit, to the switching center of the first radio access scheme, the message for the first protocol separately from the transparent container.

In the first aspect, the mobile communication method can further include the steps of: including, at the switching center of the first radio access scheme, the received message for the first protocol into a message for a third protocol used in a communication between the switching center of the first radio access scheme and the mobile station, and transmitting, from the switching center of the first radio access scheme to the radio base station of the first radio access scheme, the message for the third protocol; and including, at radio base station of the first radio access scheme, the security processing algorithm of the first protocol and the security processing parameter of the first protocol included in the message for the first protocol included in the message for the third protocol received from the switching center of the first radio access scheme, into a message for a fourth protocol used in a communication between the radio base station of the first radio access scheme and the mobile station, and transmitting the security processing algorithm of the first protocol and the security processing parameter of the first protocol.

In the first aspect, in the step (D), the switching center of the second radio access scheme can include the security processing algorithm of the first protocol and the security processing parameter of the first protocol into the message for the first protocol, and can transmit, to the switching center of the first radio access scheme, the security processing algorithm of the first protocol and the security processing parameter of the first protocol separately from the transparent container; and the switching center of the first radio access scheme can include a message for a first protocol including the security processing algorithm of the first protocol and the security processing parameter of the first protocol, into a message for a third protocol used in a communication between the switching center of the first radio access scheme and the mobile station, and can transmit the security processing algorithm of the first protocol and the security processing parameter of the first protocol separately from the transparent container.

In the first aspect, the mobile communication method can further include the steps of: generating, at the switching center of the second radio access scheme, the message for the first protocol, by performing integrity protection processing using the security processing algorithm of the first protocol and the security processing parameter of the first protocol; determining, at the mobile station, whether the message for the first protocol has been interpolated, by performing integrity protection processing using the received security processing algorithm of the first protocol and the security processing parameter of the first protocol; and notifying, at the mobile station, a radio control station of the first radio access scheme that the handover procedure failed, when the message for the first protocol is determined to have been interpolated.

A second aspect of the present invention is summarized as a switching center capable of functioning as a switching center of a second radio access scheme, with which a mobile station is capable of performing a procedure for performing handover from a first cell under the control of a radio base station of a first radio access scheme to a second cell under the control of a radio base station of the second radio access scheme, the switching center comprising: a selector unit configured to select, in the procedure, a security processing algorithm of a first protocol used in a communication between the mobile station and the switching center of the second radio access scheme; a generator unit configured to generate, in the procedure, a security processing parameter of the first protocol; a receiver unit configured to receive, in the procedure, from the radio base station of the second radio access scheme, a handover request acknowledge message including a transparent container including the security processing algorithm of a second protocol used in a communication between the radio base station of the second radio access scheme and the mobile station; and a transmitter unit configured to transmit, in the procedure, to the switching center of the first radio access scheme, a first message including the transparent container, the security processing algorithm of the first protocol and the security processing parameter of the first protocol.

As described above, according to the present invention, it is possible to provide a mobile communication method and a switching center with which security-related information used in a communication before handover can be appropriately carried over to a communication after handover in a handover process, which is performed by the mobile station UE, from a first cell under the control of a radio base station of a first radio access scheme to a second cell under the control of a radio base station of a second radio access scheme.

BRIEF DESCRIPTION OF THE DRAWINGS

FIG. 9 is a sequence diagram showing an exemplary operation 5 of the mobile communication system according to the first embodiment of the present invention.

BEST MODES FOR CARRYING OUT THE INVENTION (Configuration of Mobile Communication System According to First Embodiment of the Present Invention)

A configuration of a mobile communication system according to a first embodiment of the present invention is described referring to FIG. 1 to FIG. 4.

Figure 1:
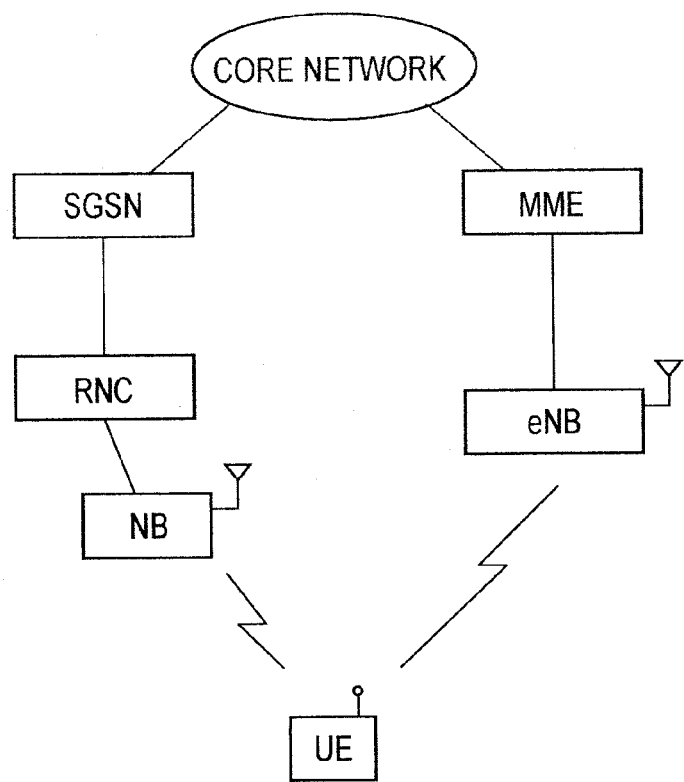
FIG. 1 is an overall configurational view of a mobile communication system according to a first embodiment of the present invention.

As shown in FIG. 1, the mobile communication system according to this embodiment includes a switching center SGSN of the UTRA scheme (a first radio access scheme), a radio control station RNC of the UTRA scheme, a radio base station NB of the UTRA scheme, a switching center MME of the E-UTRA scheme (a second radio access scheme) and a radio base station eNB of the E-UTRA scheme.

Here, it is assumed that in the mobile communication system according to this embodiment, a "NAS (Non Access Stratum, a first protocol)" is used in communications between the switching center MME of the E-UTRA scheme and mobile station UE, an "AS (Access Stratum, a second protocol)" is used in communications between a radio base station eNB of the E-UTRA scheme and the mobile station UE, a "NAS (a third protocol)" is used in communications between a switching center SGSN of the UTRA scheme and the mobile station UE, and an "AS (a fourth protocol)" is used in communications between a radio control station RNC of the UTRA scheme and the mobile station UE.

A NAS message (a message for a first protocol) transmitted and received between the switching center MME of the E-UTRA scheme and the mobile station UE is expressed as a "NAS PDU (E-UTRA)", an AS message (a message for a second protocol) transmitted and received between the radio base station eNB of the E-UTRA scheme and the mobile station UE is expressed as an "AS PDU (E-UTRA)", a NAS message (a message for a third protocol) transmitted and received between the switching center SGSN of the UTRA scheme and the mobile station UE is expressed as a "NAS PDU (UTRA)", and an AS message (a message for a fourth protocol) transmitted and received between the radio control station RNC of the UTRA scheme and the mobile station UE is expressed as an "AS PDU (UTRA)".

Figure 2:
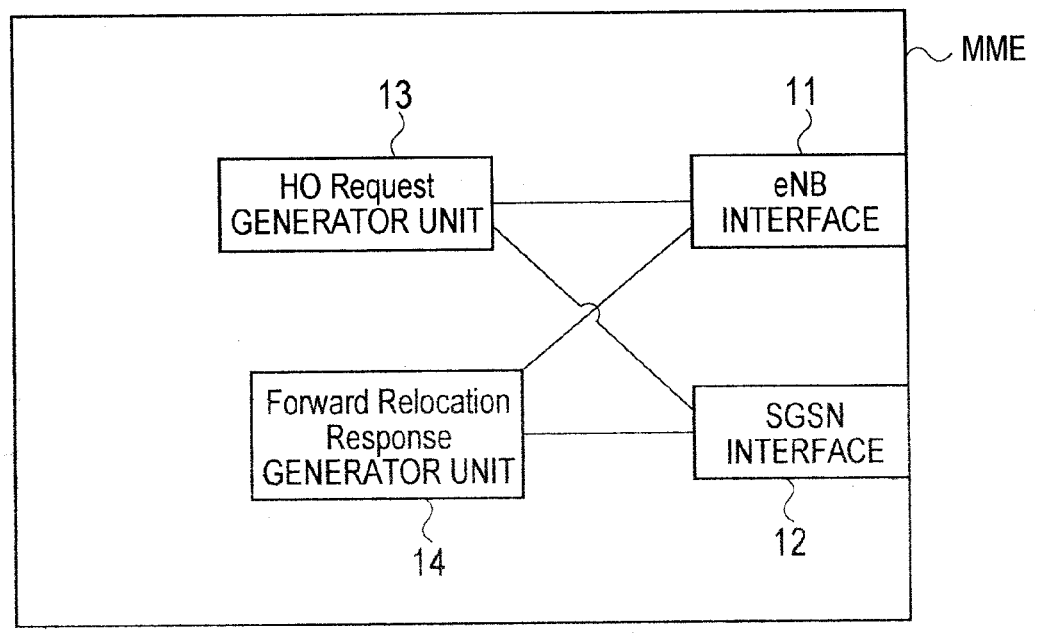
FIG. 2 is a functional block diagram of a switching center according to the first embodiment of the present invention.

As shown in FIG. 2, the switching center MME of the E-UTRA scheme includes an eNB interface 11, a SGSN interface 12, an HO Request generator unit 13 and a Forward Relocation Response generator unit 14.

The eNB interface 11 is an interface with the radio base station eNB of the E-UTRA scheme.

Moreover, the eNB interface 11 terminates "S1-Application Protocol" to communicate with the radio base station eNB of the E-UTRA scheme.

For example, the eNB interface 11 is configured to transmit "HO Request (S1 message)" to the radio base station eNB of the E-UTRA scheme, and to receive "HO Request Ack (S1 message)" from the radio base station eNB of the E-UTRA scheme, in the procedure where the mobile station UE performs handover from a first cell under the control of the radio base station NB of the UTRA scheme to a second cell under the control of the radio base station eNB of the E-UTRA scheme.

Here, the "HO Request Ack (S1 message)" is a handover request acknowledge message including a transparent container "RRCConnectionReconfig" including a security processing algorithm of the AS of the E-UTRA scheme.

For example, the security processing in the AS includes ciphering processing and integrity protection processing.

In the ciphering processing in the AS, an AS message is ciphered using a security processing parameter on the transmitting side and the AS message is decoded using a security processing parameter on the receiving side.

In the integrity protection processing in the AS, a MAC (Message Authentication Code: e.g., 32 bit length) is calculated using the AS message and a security processing parameter, and is assigned to the AS message, on the transmitting side, and whether the AS message has been interpolated is determined by using the AS message, the security processing parameter and the MAC, on the receiving side.

Furthermore, for example, "NULL", "AES", "Snow3G" and the like are assumed as the ciphering processing algorithms of the AS, and "AES", "Snow3G" and the like are assumed as the integrity protection processing algorithms of the AS.

The SGSN interface 12 is an interface with the switching center SGSN of the UTRA scheme.

For example, the SGSN interface 12 is configured to transmit "Forward Relocation Response (a first message)" to the switching center SGSN of the UTRA scheme, and to receive "Forward Relocation Request" from the switching center SGSN of the UTRA scheme, in the procedure where the mobile station UE performs handover from a first cell under the control of the radio base station NB of the UTRA scheme to a second cell under the control of the radio base station eNB of the E-UTRA scheme.

The HO Request generator unit 13 is configured to generate the "HO Request (S1 message)" described above.

Specifically, the HO Request generator unit 13 is configured to select a security processing algorithm of the NAS of the E-UTRA scheme, and to generate a security processing parameter of the NAS, when generating the "HO Request (S1 message)".

Here, the HO Request generator unit 13 may select a security processing algorithm of the NAS of the E-UTRA scheme according to "UE security capabilities (security processing capability of the mobile station UE)" included in the "Forward Relocation Request".

For example, the security processing in the NAS includes ciphering processing and integrity protection processing.

In the ciphering processing in the NAS, a NAS message is ciphered using a security processing parameter on the transmitting side and the NAS message is decoded using a security processing parameter on the receiving side.

In the integrity protection processing in the NAS, a MAC (e.g., 32 bit length) is calculated using the NAS message and a security processing parameter, and is assigned to the NAS message, on the transmitting side, and whether the NAS message has been interpolated is determined by using the NAS message, the security processing parameter and the MAC, on the receiving side.

Furthermore, for example, "NULL", "AES", "Snow3G" and the like are assumed as the ciphering processing algorithms of the NAS, and "AES", "Snow3G" and the like are assumed as integrity protection processing algorithms of the NAS.

Furthermore, "eKSI", "NONCE$_{MME}$" and the like are assumed as the security parameters of the NAS.

The Forward Relocation Response generator unit 14 is configured to generate the "Forward Relocation Response" described above.

Specifically, the Forward Relocation Response generator unit 14 is configured to generate the "Forward Relocation Response" including a transparent container "RRCConnectionReconfig", a security processing algorithm of the NAS of the E-UTRA scheme and a security processing parameter of the NAS of the E-UTRA scheme.

The Forward Relocation Response generator unit 14 may be configured to transmit the "Forward Relocation Response" in which a security processing algorithm of the NAS of the E-UTRA scheme and the "NAS PDU (E-UTRA scheme)" including a security processing parameter of the NAS of the E-UTRA scheme are included into the transparent container "RRCConnectionReconfig" (refer to FIG. 5 described later).

Here, the radio base station eNB of the E-UTRA scheme is configured to include the "NAS PDU (E-UTRA scheme)" into the transparent container "RRCConnectionReconfig".

Furthermore, the Forward Relocation Response generator unit 14 may be configured to include, into the "Forward Relocation Response", the "NAS PDU (E-UTRA scheme)" including a security processing algorithm of the NAS of the E-UTRA scheme and a security processing algorithm of the NAS of the E-UTRA scheme separately from the transparent container "RRCConnectionReconfig" (refer to FIG. 6 and FIG. 7 described later).

Here, the Forward Relocation Response generator unit 14 may be configured to perform integrity protection processing on the "NAS PDU (E-UTRA scheme)" using a security processing algorithm of the NAS of the E-UTRA scheme and a security parameter of the NAS of the UTRA scheme.

Alternatively, the Forward Relocation Response generator unit 14 may be configured to include a security processing algorithm of the NAS of the E-UTRA scheme and a security processing parameter of the NAS of the E-UTRA scheme, into the "Forward Relocation Response" as an information element visible on the SGSN interface 12, separately from the transparent container "RRCConnectionReconfig" (refer to FIG. 8 described later).

Figure 3:
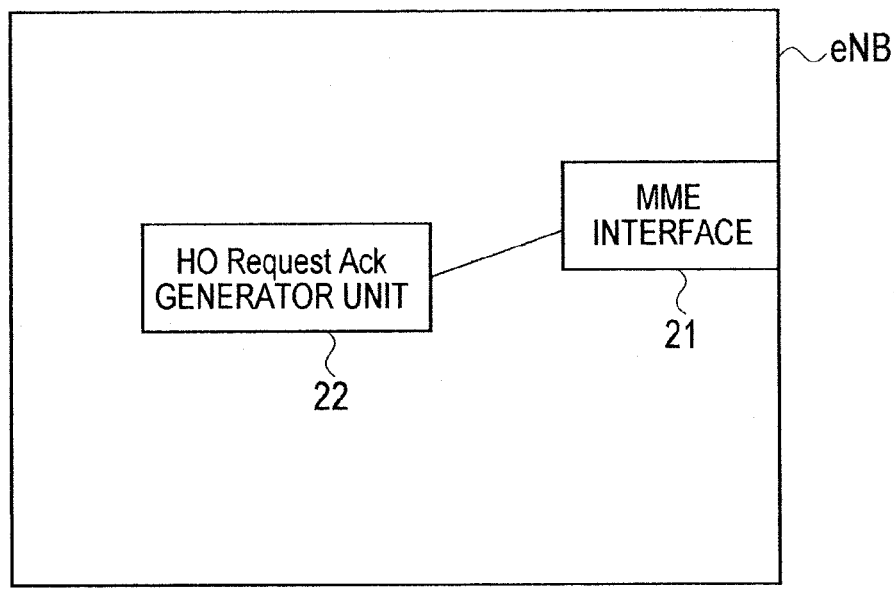
FIG. 3 is a functional block diagram of a radio base station according to the first embodiment of the present invention.

As shown in FIG. 3, the radio base station eNB of the E-UTRA scheme includes a MME interface 21 and an HO Request Ack generator unit 22.

The MME interface 21 is an interface with the switching center MME of the E-UTRA scheme.

Moreover, the MME interface 21 terminates "S1-Application Protocol" to communicate with the switching center MME of the E-UTRA scheme.

For example, the MME interface 21 is configured to transmit "HO Request Ack (S1 message)" to the radio base station eNB of the E-UTRA scheme, and to receive "HO Request (S1 message)" from the switching center MME of the E-UTRA scheme, in the procedure where the mobile station UE performs handover from a first cell under the control of the radio base station NB of the UTRA scheme to a second cell under the control of the radio base station eNB of the E-UTRA scheme.

The HO Request Ack generator unit 22 is configured to generate the "HO Request Ack (S1 message)" described above.

Specifically, the HO Request Ack generator unit 22 is configured to select a security processing algorithm of the AS of the E-UTRA scheme, and to generate a security processing parameter of the AS of the E-UTRA scheme, when generating the "HO Request Ack (S1 message)".

Here, the HO Request Ack generator unit 22 may select a security processing algorithm of the AS of the E-UTRA scheme according to "UE EPS security capabilities (security processing capability of the mobile station UE)" included in the "HO request (S1 message)".

Alternatively, the HO Request Ack generator unit 22 may select a security processing algorithm of the AS of the UTRA scheme out of AS security algorithms of the UTRA scheme designated by "Allowed AS algorithms" included in the "HO Request (S1 message)".

Figure 4:
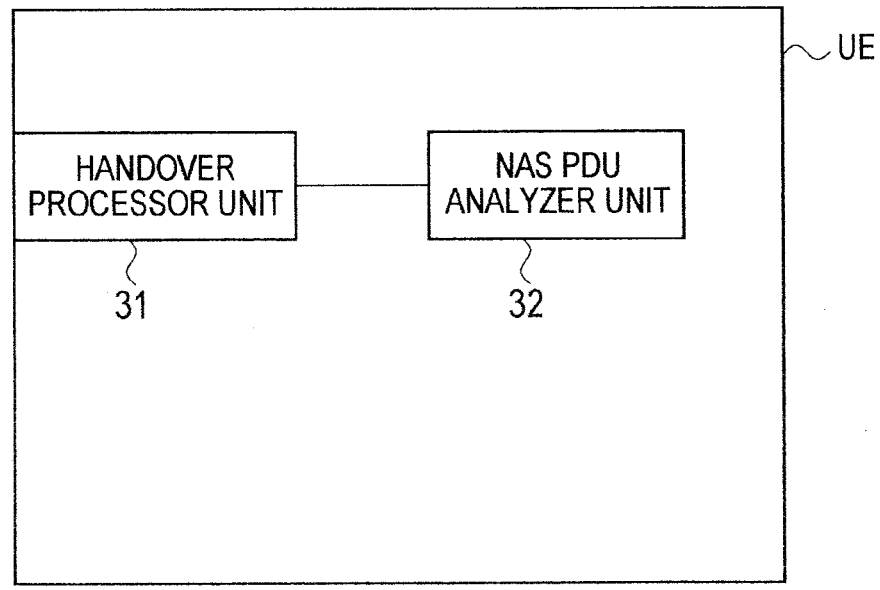
FIG. 4 is a functional block diagram of a mobile station according to the first embodiment of the present invention.

As shown in FIG. 4, the mobile station UE includes a handover processor unit 31 and a NAS PDU analyzer unit 32.

The handover processor unit 31 is configured to perform a processing required in the handover procedure, which is performed by the mobile station UE, from a first cell under the control of the radio base station NB of the UTRA scheme to a second cell under the control of the radio base station eNB of the E-UTRA scheme.

For example, the handover processor unit 31 is configured to calculate a security processing parameter of the AS of the E-UTRA scheme, by using a security processing algorithm of the NAS of the E-UTRA scheme and a security processing parameter of NAS of the E-UTRA scheme.

Furthermore, the handover processor unit 31 is configured to perform security processing in a communication using the NAS of the E-UTRA scheme, by using a security processing algorithm of the NAS of the E-UTRA scheme and a security processing parameter of the NAS of the E-UTRA scheme, and to perform security processing in a communication using the AS of the E-UTRA scheme, by using a security processing algorithm of the AS of the E-UTRA scheme and a security processing parameter of the AS of the E-UTRA scheme.

The NAS PDU analyzer unit 32 is configured to determine whether the received "NAS PDU (E-UTRA scheme)" has been interpolated by performing integrity protection processing using a security processing algorithm of the NAS of the E-UTRA scheme and a security processing parameter of the NAS of the E-UTRA scheme.

The handover processor unit 31 is configured to notify a handover source radio access apparatus (for example, the radio control station RNC or the switching center SGSN) that the handover procedure described above failed, when the NAS PDU analyzer unit 32 determines that the "NAS PDU (E-UTRA scheme)" has been interpolated.

(Operation of Mobile communication System According to First Embodiment of the Present Invention)

Exemplary operations 1 to 4 of the mobile communication system according to the first embodiment of the present invention are described referring to FIG. 5 to FIG. 9. Specifically, a handover procedure of the mobile station UE from a first cell under the control of the radio base station NB of the UTRA scheme to a second cell under the control of the radio base station eNB of the E-UTRA scheme is described.

Figure 5:
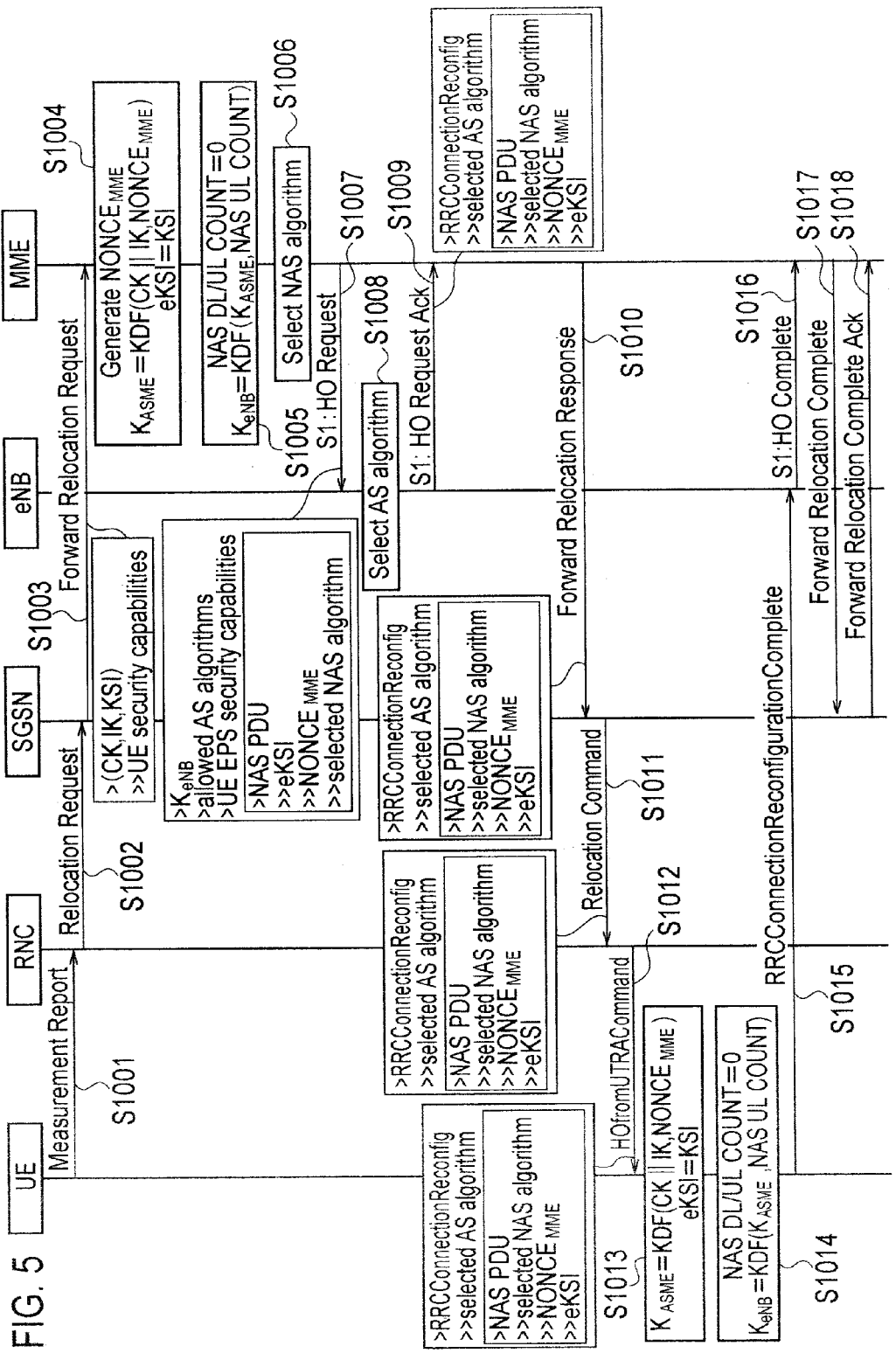
FIG. 5 is a sequence diagram showing an exemplary operation 1 of the mobile communication system according to the first embodiment of the present invention.

First, the exemplary operation 1 of the mobile communication system according to the first embodiment of the present invention is described referring to FIG. 5.

As shown in FIG. 5, in step S1001, a mobile station UE communicating in the first cell under the control of the radio base stationNB of the UTRA scheme transmits "Measurement Report" to a radio control station RNC of the UTRA scheme.

In step S1002, the radio control station RNC of the UTRA scheme transmits "Relocation Request" to a switching center SGSN of the UTRA scheme.

In step S1003, the switching center SGSN of the UTRA scheme transmits "Forward Relocation Request" to a switching center MME of the E-UTRA scheme.

Here, the "Forward Relocation Request" includes "CK", "IK", "KSI" and "UE security capabilities" representing the security processing capability of the mobile station UE, which are security processing parameters of the NAS of the UTRA scheme.

The "UE security capabilities" includes "UE EPS security capabilities" representing the security processing capability of the mobile station UE in the E-UTRA scheme.

The "UE security capabilities" may include information elements representing the security processing capability of the mobile station UE in the UTRA scheme and other radio access schemes.

In step S1004, the switching center MME of the E-UTRA scheme generates "NONCE$_{MME}$". Here, the "NONCE$_{MME}$" is a randomly selected bit string of 32 bit length.

Furthermore, the switching center MME of the E-UTRA scheme generates "K$_{ASME}$" from Formula (1).

$$K_{ASME}=KDF(CK\|IK,NONCE_{MME}) \quad \text{Formula (1)}$$

Furthermore, the switching center MME of the E-UTRA scheme generates "eKSI" from Formula (2).

$$eKSI=KSI \quad \text{Formula (2)}$$

In step S1005, the switching center MME of the E-UTRA scheme sets "NAS DL COUNT" and "NAS UL COUNT" to "0", and then generates "K$_{eNB}$" from Formula (3). Here, the "NAS DL COUNT" is a sequence number of the NAS message of the E-UTRA scheme in the downlink, and the "NAS UL COUNT" is a sequence number of the NAS message of the E-UTRA scheme in the uplink.

$$K_{eNB}=KDF(K_{ASME},\text{NAS UL COUNT}) \quad \text{Formula (3)}$$

In step S1006, the switching center MME of the E-UTRA scheme selects a security processing algorithm of the NAS of the E-UTRA scheme according to the "UE EPS security capabilities".

In step S1007, the switching center MME of the E-UTRA scheme transmits "HO Request (S1 message)" to the radio base station eNB of the E-UTRA scheme.

Here, the "HO Request (S1 message)" includes "K$_{eNB}$", "allowed AS algorithms" and "UE EPS security capabilities". The "HO Request (S1 message)" may not include "allowed AS algorithms".

Furthermore, the "HO Request (S1 message)" includes "NAS PDU (E-UTRA scheme)" including "eKSI", "NONCE$_{MME}$" and "selected NAS algorithm" as a transparent container. Here, the "selected NAS algorithm" represents a security processing algorithm of the NAS of the E-UTRA scheme selected in step S1006.

In step S1008, the radio base station eNB of the E-UTRA scheme selects one security processing algorithm of the AS of the E-UTRA scheme out of security processing algorithms of the AS of the E-UTRA designated by the "allowed AS algorithms" according to the "UE EPS security capabilities".

Specifically, a ciphering processing algorithm of the AS of the E-UTRA scheme and an AS integrity protection processing algorithm of the AS of the E-UTRA scheme are selected.

In step S1009, the radio base station eNB of the E-UTRA scheme transmits "HO Request Ack (S1 message)" to the switching center MME of the E-UTRA scheme.

The "HO Request Ack (S1 message)" includes a transparent container "RRCConnectionReconfig", which includes "selected AS algorithm" and "NAS PDU" including "eKSI", "NONCE$_{MME}$" and "selected NAS algorithm". The "selected AS algorithm" represents the security processing algorithm of the AS of the E-UTRA scheme selected in step S1008.

In step S1010, the switching center MME of the E-UTRA scheme transmits, to the switching center SGSN of the UTRA scheme, "Forward Relocation Response" including the transparent container "RRCConnectionReconfig".

In step S1011, the switching center SGSN of the UTRA scheme transmits, to the radio control station RNC of the UTRA scheme, "Relocation Command" including the "RRCConnectionReconfig".

In step S1012, the radio control station RNC of the UTRA scheme transmits, to the mobile station UE, "HOfromUTRA-Command (handover command message)" including the transparent container "RRCConnectionReconfig".

In step S1013, the mobile station UE extracts "NAS PDU (E-UTRA scheme)" included in the received "HOfromUTRACommand" and generates "K$_{ASME}$" from Formula (4) using "NONCE$_{MME}$" included in "NAS PDU (E-UTRA scheme)" and "CK" and "IK" used in a communication before handover.

$$K_{ASME}=KDF(CK\|IK,NONCE_{MME}) \quad \text{Formula (4)}$$

The mobile station UE may generate the "eKSI" from Formula (5), by using the "KSI" used in the communication before handover.

$$eKSI=KSI \quad \text{Formula (5)}$$

Here, the mobile station UE may use the "eKSI" included in the "NAS PDU (E-UTRA scheme)" within the received "HOfromUTRACommand", instead of the "eKSI" generated from Formula (5) in the security processing in the NAS of the E-UTRA scheme.

In step S1014, the mobile station UE sets "NAS DL COUNT" and "NAS UL COUNT" to "0", and then generates "K$_{eNB}$" from Formula (6).

$$K_{eNB}=KDF(K_{ASME},\text{NAS UL COUNT}) \quad \text{Formula (6)}$$

In step S1015, the mobile station UE transmits, to the radio base station eNB of the E-UTRA scheme, "RRCConnection-ReconfigurationComplete (AS message of the E-UTRA scheme)" subjected to security processing in the AS of the E-UTRA scheme using "K$_{eNB}$".

Here, the mobile station UE performs the integrity protection processing on the "NAS PDU (E-UTRA scheme)" included in the "HOfromUTRACommand" with a security processing algorithm of the NAS of the E-UTRA scheme ("AES" and the like) using "K$_{ASME}$" and "eKSI" to determine whether the "NAS PDU (E-UTRA scheme)" has been interpolated. If it has been determined that the "NAS PDU (E-UTRA scheme)" has been interpolated, the mobile station UE transmits, to the radio control station RNC or the switching center SGSN of the UTRA scheme, an AS message of the UTRA scheme or a NAS message of the UTRA scheme notifying that the handover procedure has failed.

In step S1016, the radio base station eNB of the E-UTRA scheme transmits, to the switching center MME of the E-UTRA scheme, "HO Complete (S1 message)".

In step S1017, the switching center MME of the E-UTRA scheme transmits, to the switching center SGSN of the UTRA scheme, "Forward Relocation Complete", and in step S1018, the switching center SGSN of the UTRA scheme transmits, to the switching center MME of the E-UTRA scheme, "Forward Relocation Complete Ack".

Figure 6:
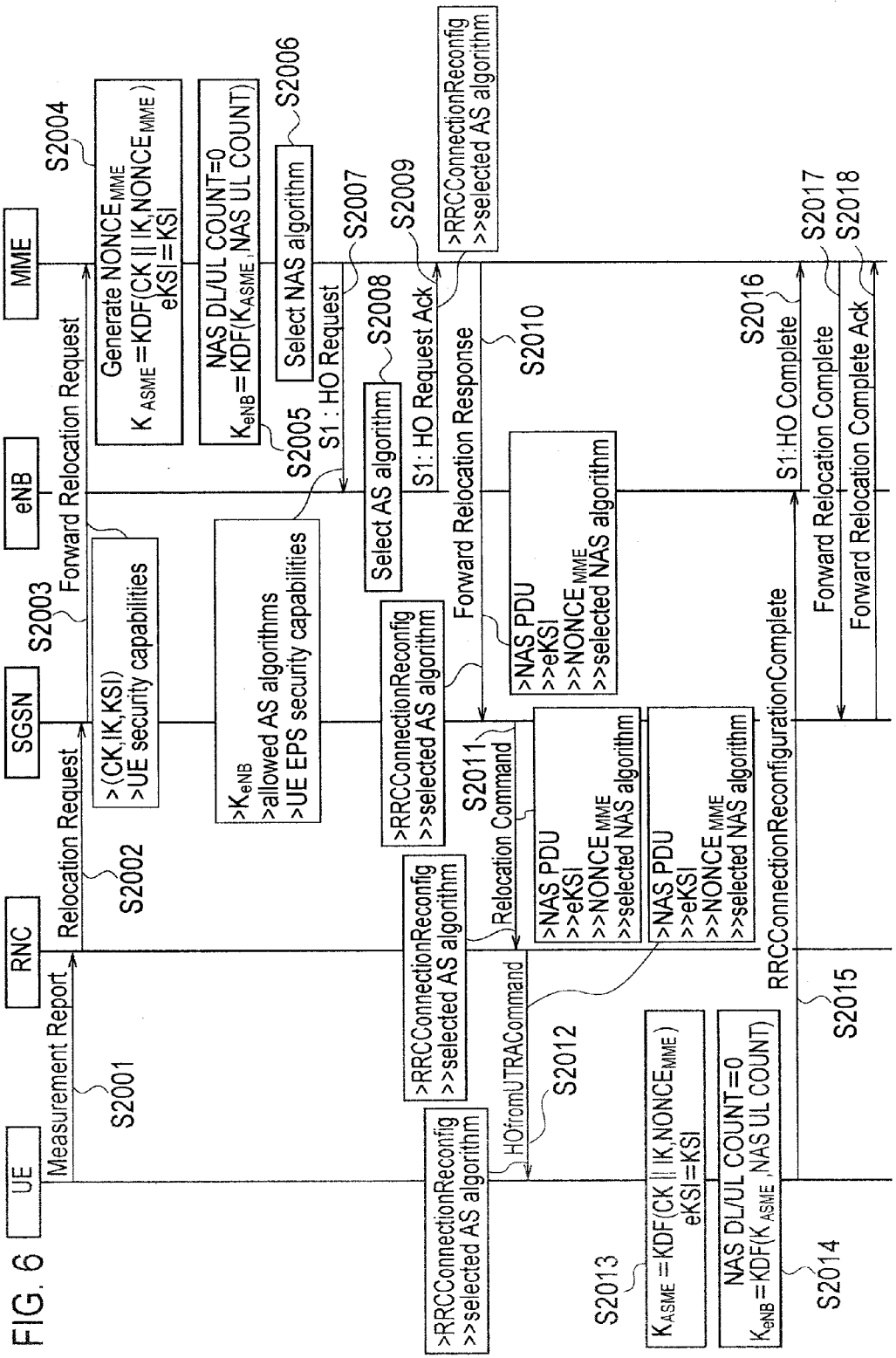
FIG. 6 is a sequence diagram showing an exemplary Operation 2 of the mobile communication system according to the first embodiment of the present invention.

Secondly, the exemplary operation 2 of the mobile communication system according to the first embodiment of the present invention is described referring to FIG. 6.

As shown in FIG. 6, operations in steps S2001 to 2006 are the same as the operations in steps S1001 to S1006 in FIG. 5.

In step S2007, the switching center MME of the E-UTRA scheme transmits "HO Request (S1 message)" to the radio base station eNB of the E-UTRA scheme.

Here, the "HO Request (S1 message)" includes "K$_{eNB}$", "allowed AS algorithms" and "UE EPS security capabilities". The "HO Request (S1 message)" may not include the "allowed AS algorithms".

Meanwhile, the "HO Request (S1 message)" does not include the "NAS PDU" including "eKSI", "NONCE$_{MME}$" and "selected NAS algorithm" shown in FIG. 5, as a transparent container.

In step S2008, the radio base station eNB of the E-UTRA scheme selects one security processing algorithm of the AS of the E-UTRA scheme out of security processing algorithms of the AS of the E-UTRA designated by the "allowed AS algorithms" according to the "UE EPS security capabilities".

Specifically, a ciphering processing algorithm of the AS of the E-UTRA scheme and an integrity protection processing algorithm of the AS of the E-UTRA scheme are selected.

In step S2009, the radio base station eNB of the E-UTRA scheme transmits "HO Request Ack (S1 message)" to the switching center MME of the E-UTRA scheme.

The "HO Request Ask (S1 message)" includes the transparent container "RRCConnnectionReconfig". Also, the transparent container "RRCConnectionReconfig" includes "selected AS algorithm" only, and does not include "NAS PDU (E-UTRA scheme)" including "eKSI", "NONCE$_{MME}$" and "selected NAS algorithm" shown in FIG. 5.

In step S2010, the switching center MME of the E-UTRA scheme transmits, to the switching center SGSN of the UTRA scheme, "Forward Relocation Response" including the transparent container "RRCConnectionReconfig".

Here, the switching center MME of the E-UTRA scheme includes, into the "Forward Relocation Response", the "NAS PDU (E-UTRA scheme)" including the "eKSI", the "NONCE$_{MME}$" and the "selected NAS algorithm" shown in FIG. 5, separately from the transparent container "RRCConnection-Reconfig".

In step S2011, the switching center SGSN of the UTRA scheme transmits, to the radio control station RNC of the UTRA scheme, "Relocation Command" including the transparent container "RRCConnectionReconfig" and "NAS PDU (UTRA scheme)".

Here, the "NAS PDU (E-UTRA scheme)" received from the switching center MME of the E-UTRA scheme is included into "NAS PDU (UTRA scheme)", and then transmitted by the switching center SGSN of the UTRA scheme.

In step S2012, the radio control station RNC of the UTRA scheme transmits, to the mobile station UE, "HOfromUTRA-Command (handover command message)" including the transparent container "RRCConnectionReconfig" and "NAS PDU (UTRA scheme)".

Operations in step S2013 to step S2018 thereafter are same as operations in step S1013 to step S1018 shown in FIG. 5.

Figure 7:
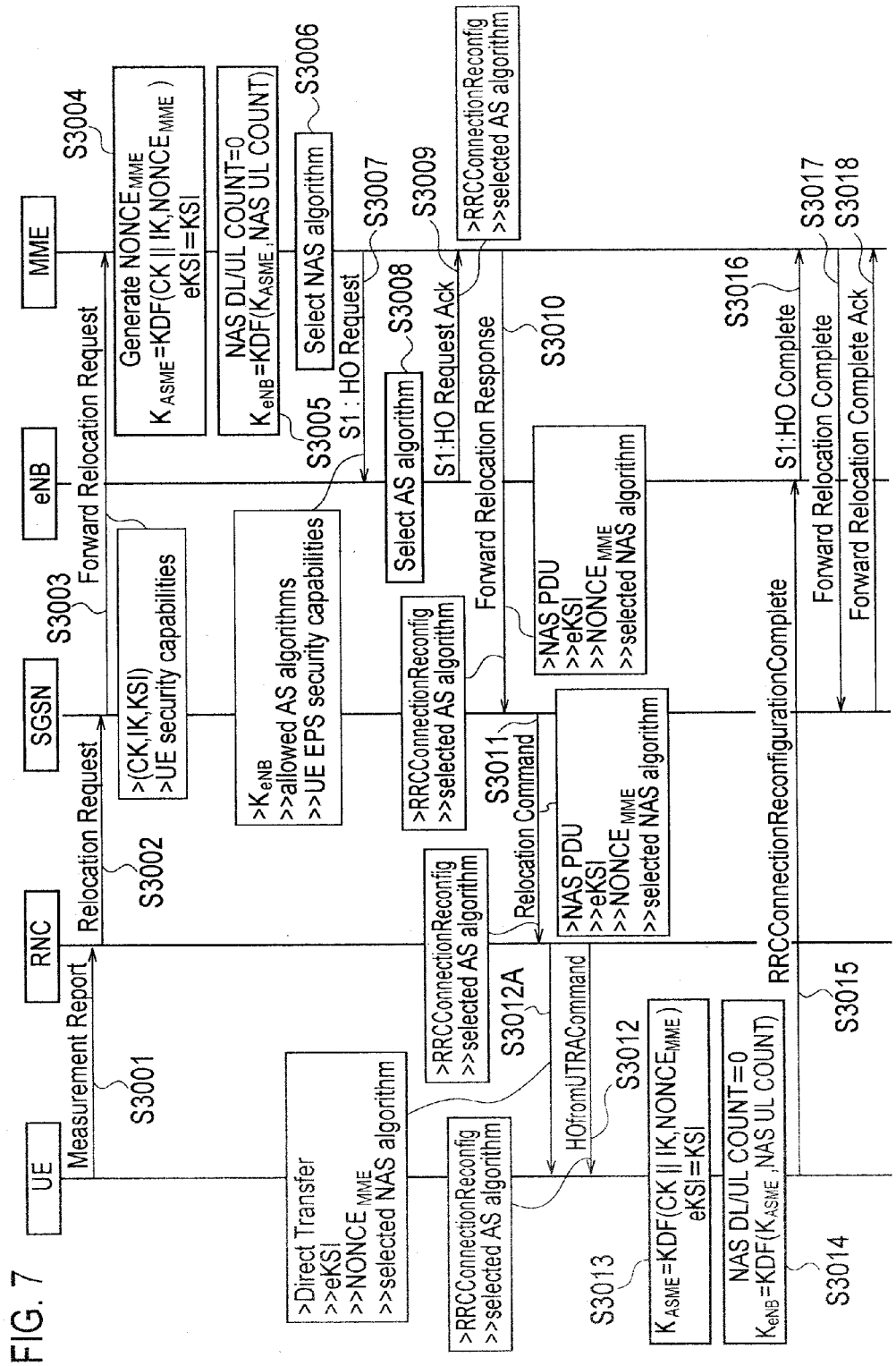
FIG. 7 is a sequence diagram showing an exemplary operation 3 of the mobile communication system according to the first embodiment of the present invention.

Thirdly, the exemplary operation 3 of the mobile communication system according to the first embodiment of the present invention is described referring to FIG. 7.

As shown in FIG. 7, operations in steps S3001 to S3011 are the same as the operations in steps S2001 to S2011 in FIG. 6.

In step S3012A, the radio control station RNC of the UTRA scheme transmits, to the mobile station UE, "Direct Transfer (AS message)" including "NAS PDU (UTRA scheme)" included in the "Relocation Command" received from the switching center SGSN of the UTRA scheme separately from the transparent container "RRCConnectionReconfig".

In step S3012, the radio control station RNC of the UTRA scheme transmits, to the mobile station UE, "HOfromUTRACommand (handover command message)" including the transparent container "RRCConnectionReconfig" but not including "NAS PDU (UTRA scheme)" and "NAS PDU (E-UTRA scheme)".

Here, the "Direct Transfer" and "HOfromUTRACommand" may be transmitted via the same radio bearer ensuring the sequence so that the receiving sequence of the "Direct Transfer" and the "HOfromUTRACommand" in the mobile station UE is ensured.

Alternatively, the radio control station RNC of the UTRA scheme may be configured to transmit "HOfromUTRACommand" after the mobile station UE has transmitted a response signal to "Direct Transfer" (AS message of the UTRA scheme) and the radio control station RNC of the UTRA scheme has received the response signal (AS message of the UTRA scheme).

Alternatively, configuration may be such that the mobile station UE transmits a response signal (NAS message of the UTRA scheme) for the "NAS PDU (UTRA scheme)" included in the "Direct Transfer", the switching center SGSN of the UTRA scheme notifies, to the radio control station RNC of the UTRA scheme, a reception of the reception signal after receiving the response signal (NAS message of the UTRA scheme), and the radio control station RNC of the UTRA scheme transmits the "HofromUTRACommand" after receiving the notification.

Operations in step S3013 to step S3018 thereafter are same as operations in step S1013 to step S1018 shown in FIG. 5.

Figure 8:
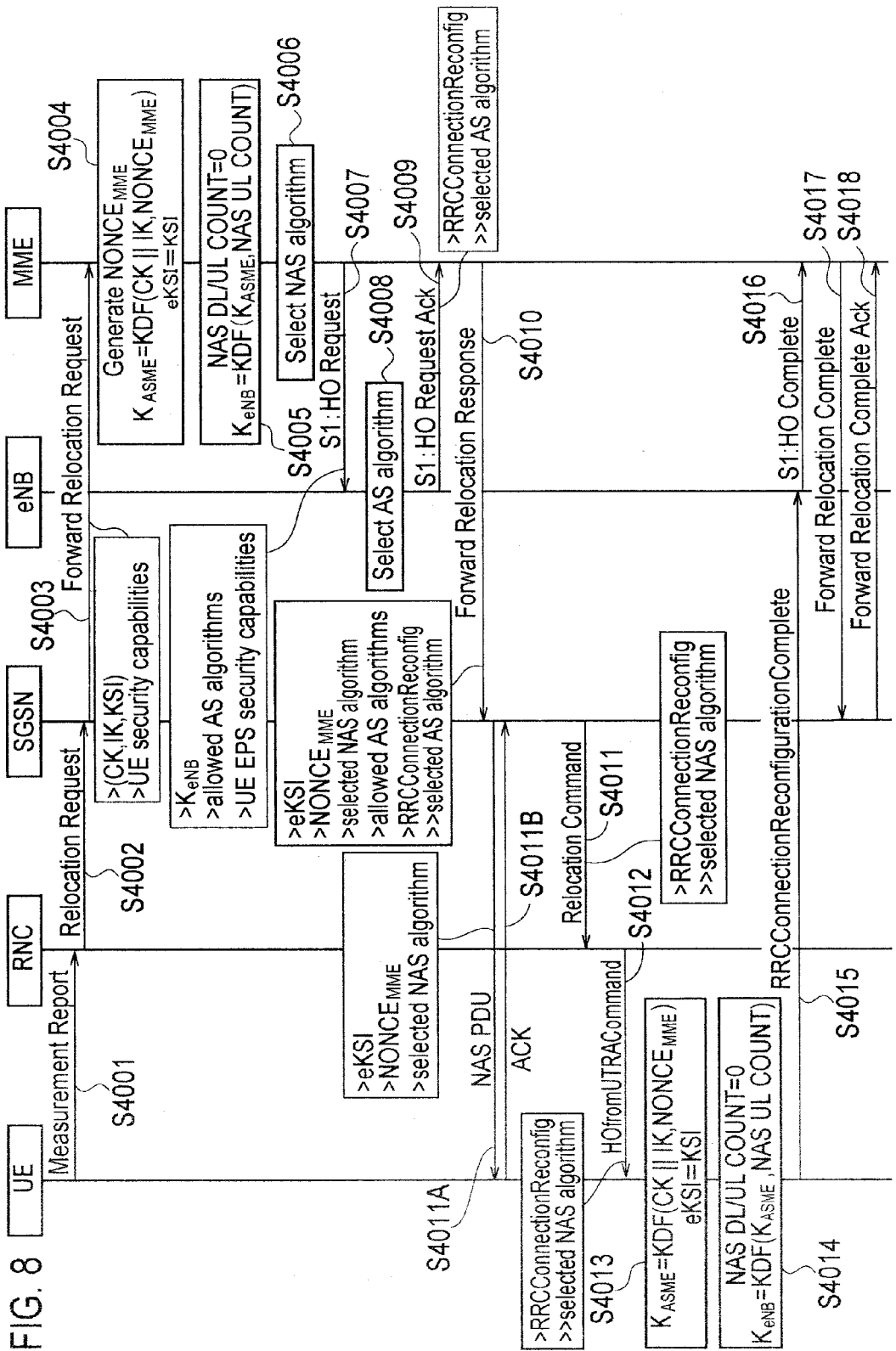
FIG. 8 is a sequence diagram showing an exemplary operation 4 of the mobile communication system according to the first embodiment of the present invention.

Fourthly, the exemplary operation 4 of the mobile communication system according to the first embodiment of the present invention is described referring to FIG. 8.

As shown in FIG. 8, operations in steps S4001 to 4009 are the same as the operations in steps S3001 to S3009 in FIG. 7.

In step S4010, the switching center MME of the E-UTRA scheme transmits, to the switching center SGSN of the UTRA scheme, "Forward Relocation Response" including the transparent container "RRCConnectionReconfig".

Here, the switching center MME of the E-UTRA scheme includes, into the "Forward Relation Response", "eKSI", "NONCE$_{MME}$" and "selected NAS algorithm" each serving as information elements, separately from the transparent container "RRCConnectionReconfig".

In step S4011A, the switching center SGSN of the UTRA scheme generates and transmits, to the mobile station UE, "NAS PDU (UTRA scheme)" including "eKSI", "NONCE$_{MME}$" and "selected NAS algorithm" included in the "Forward Relocation Response", and in step S4011B, receives, from the mobile station UE, "Ack" indicating receipt of the "NAS PDU (UTRA scheme)" described above.

In step S4011, the switching center SGSN of the UTRA scheme transmits, to the radio station RNC of the UTRA scheme, "Relocation Command" including the transparent container "RRCConnectionReconfig" but not including "eKSI", "NONCE$_{MME}$" and "selected NAS algorithm" described above.

In step S4012, the radio control station RNC of the UTRA scheme transmits, to the mobile station UE, "HOfromUTRACommand (handover command message)" including the transparent container "RRCConnectionReconfig" but not including "eKSI", "NONCE$_{MME}$" and "selected NAS algorithm" described above.

Operations in step S4013 to step S4018 thereafter are same as operations in step S1013 to step S1018 shown in FIG. 5.

Fifthly, the exemplary operation 5 of the mobile communication system according to the first embodiment of the present invention is described referring to FIG. 9

As shown in FIG. 9, operations in steps S5001 to 5006 are the same as the operations in steps S1001 to S1006 in FIG. 5.

In step S5007, the switching center MME of the E-UTRA scheme transmits "HO Request (S1 message)" to the radio base station eNB of the E-UTRA scheme.

Here, the "HO Request (S1 message)" includes "K$_{eNB}$", "allowed AS algorithms", "UE EPS security capabilities", "eKSI", "NONCE$_{MME}$" and "selected NAS algorithm". The "HO Request (S1 message)" may not include the "allowed AS algorithms".

In step S5008, the radio base station eNB of the E-UTRA scheme selects one security processing algorithm of the AS of the E-UTRA scheme out of security processing algorithms of the AS of the E-UTRA designated by the "allowed AS algorithms" according to the "UE EPS security capabilities".

Specifically, a ciphering processing algorithm of the AS of the E-UTRA scheme and an integrity protection processing algorithm of the AS of the E-UTRA scheme are selected.

In step S5009, the radio base station eNB of the E-UTRA scheme transmits "HO Request Ack (S1 message)" to the switching center MME of the E-UTRA scheme.

The "HO Request Ack (S1 message)" includes the transparent container "RRCConnectionReconfig", and the transparent container "RRCConnectionReconfig" includes "selected AS algorithm", "eKSI", "NONCE$_{MME}$" and "selected NAS algorithm".

Operations in step S5010 to step S5018 thereafter are same as operations in step S1010 to step S1018 shown in FIG. 5.

(Advantageous Effects of the Mobile Communication System According to First Embodiment of the Present Invention)

In the mobile communication system according to the first embodiment of the present invention, the mobile station UE can appropriately carry over the NAS security parameters of the UTRA scheme and the AS security parameters of the UTRA scheme as the NAS security parameters of the E-UTRA scheme and the AS security parameters of the E-UTRA scheme in a handover procedure from a cell under the control of a radio base station NB of the UTRA scheme to a cell under the control of a radio base station eNB of the E-UTRA scheme.

Furthermore, as exemplary shown in FIG. 5 to FIG. 8, in the mobile communication system according to the first embodiment of the present invention, the "selected NAS algorithm" representing the security processing algorithm of the NAS of the E-UTRA scheme and the "eKSI" and the "NONCE$_{MME}$" representing security processing parameters of the NAS of the E-UTRA scheme are configured not to be included directly in the "RRCConnectionReconfig" which is the AS message of the E-UTRA scheme as information elements, whereby independence of the NAS and the AS can be maintained.

In the mobile communication system according to the first embodiment of the present invention, when the "NAS PDU (E-UTRA scheme)" is interpolated at a radio base station eNB of the E-UTRA scheme neighboring the user, such handover procedure may be terminated by performing integrity protection on the "NAS PDU" including the "selected NAS algorithm", the "eKSI" and the "NONCE$_{MME}$".

Note that operation of the above described mobile station UE, the radio base station NB/eNB, the switching center SGSN/MME and the radio control station RNC may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE, the radio base station NB/eNB, the switching center SGSN/MME and the radio control station RNC. Also, the storage medium and the processor may be provided in the mobile station UE, the radio base station NB/eNB, the switching center SGSN/MME and the radio control station RNC as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile communication method, in a procedure for a mobile station to perform handover from a first cell under the control of a radio base station of a first radio access scheme to a second cell under the control of a radio base station of a second radio access scheme, the mobile communication method comprising the steps of:
   (A) transmitting, from a switching center of the first radio access scheme to a switching center of the second radio access scheme, a handover request message including a security processing parameter of a first protocol of the first radio access scheme used in a communication between the mobile station and the switching center of the first radio access scheme and a security processing capability of the mobile station in the second radio access scheme;
   (B) selecting, at the switching center of the second radio access scheme, a security processing algorithm of a first protocol of the second radio access scheme used in a communication between the mobile station and the switching center of the second radio access scheme, based on the security processing capability of the mobile station in the second radio access scheme;
   (C) generating, at the switching center of the second radio access scheme, a security processing parameter of the first protocol of the second radio access scheme;
   (D) transmitting, from the switching center of the second radio access scheme to a radio base station of the second radio access scheme, a handover request message including the security processing capability of the mobile station in the second radio access scheme, the security processing algorithm of the first protocol of the second radio access scheme selected in the step (B) and the security processing parameter of the first protocol of the second radio access scheme;
   (E) selecting, at the radio base station of the second radio access scheme, a security processing algorithm of a second protocol of the second radio access scheme used in a communication between the mobile station and the radio base station of the second radio access scheme, based on the security processing capability of the mobile station in the second radio access scheme;
   (F) transmitting, from the radio base station of the second radio access scheme to the switching center of the second radio access scheme, a handover request acknowledge message with a transparent container including the security algorithm of the first protocol of the second radio access scheme, the security processing parameter of the first protocol of the second radio access scheme and the security processing algorithm of the second protocol of the second radio access scheme selected at the step (E);
   (G) transmitting, from the switching center of the second radio access scheme to the switching center of the first radio access scheme, a message including the transparent container, in response to the received handover request acknowledge message;
   (H) calculating, at the mobile station upon receiving the transparent container in the first cell, a security processing parameter of the second protocol of the second radio access scheme, by using the security processing algorithm of the first protocol of the second radio access scheme and the security processing parameter of the first protocol of the second radio access scheme;
   (I) performing, at the mobile station in the second cell, security processing in a communication using the first protocol of the second radio access scheme, by using the security processing algorithm of the first protocol of the second radio access scheme and the security processing parameter of the first protocol of the second radio access scheme; and
   (J) performing, at the mobile station in the second cell, security processing in a communication using the second protocol of the second radio access scheme, by using the security processing algorithm of the second protocol of the second radio access scheme and the security processing parameter of the second protocol of the second radio access scheme.

2. The mobile communication method according to claim 1 further comprising the steps of:
   generating, at the switching center of the second radio access scheme, a message for the first protocol of the second radio access scheme, by performing integrity protection processing using the security processing algorithm of the first protocol of the second radio access scheme and the security processing parameter of the first protocol of the second radio access scheme;
   determining, at the mobile station, whether the message for the first protocol of the second radio access scheme has been interpolated, by performing integrity protection processing using the received security processing algorithm of the first protocol of the second radio access scheme and the security processing parameter of the first protocol of the second radio access scheme; and
   notifying, at the mobile station, a radio control station of the first radio access scheme or the switching center of the first radio access scheme that the handover procedure failed, when the message for the first protocol of the second radio access scheme is determined to have been interpolated.

3. A switching center capable of functioning as a switching center of a second radio access scheme, with which a mobile station is capable of performing a procedure for performing handover from a first cell under the control of a radio base station of a first radio access scheme to a second cell under the control of a radio base station of the second radio access scheme, the switching center comprising:

a first receiver unit configured to receive, in the procedure, a handover request message including a security processing parameter of a first protocol of the first radio access scheme used in a communication between the mobile station and a switching center of the first radio access scheme and a security processing capability of the mobile station in the second radio access scheme, from the switching center of the first radio access scheme;

a selector unit configured to select, in the procedure, a security processing algorithm of a first protocol of the second radio access scheme used in a communication between the mobile station and the switching center of the second radio access scheme, based on the security processing capability of the mobile station in the second radio access scheme received by the first receiver unit;

a generator unit configured to generate, in the procedure, a security processing parameter of the first protocol of the second radio access scheme;

a first transmitter unit configured to transmit, to a radio base station of the second radio access scheme, a handover request message including the security processing capability of the mobile station in the second radio access scheme, the security processing algorithm of the first protocol of the second radio access scheme selected by the selector unit and the security processing parameter of the first protocol of the second radio access scheme;

a second receiver unit configured to receive, in the procedure, from the radio base station of the second radio access scheme, a handover request acknowledge message with a transparent container including the security processing algorithm of the first protocol of the second radio access scheme, the security processing parameter of a radio base station of the second of the first protocol of the radio access scheme and a security processing algorithm of a second protocol of the second radio access scheme used in a communication between the radio base station of the second radio access scheme and the mobile station; and a second transmitter unit configured to transmit, in the procedure, a message including the transparent container to the switching center of the first radio access scheme.

4. A radio base station capable of functioning as a radio base station of a second radio access scheme, with which a mobile station is capable of performing a procedure for performing handover from a first cell under the control of a radio base station of a first radio access scheme to a second cell under the control of the radio base station of the second radio access scheme, the radio base station comprising:

a receiver unit configured to receive from a switching center of the second radio access scheme in the procedure, a handover request message including a security processing capability of the mobile station in the second radio access scheme, a security processing algorithm of a first protocol of the second radio access scheme used in a communication between the mobile station and the switching center of the second radio access scheme and a security processing parameter of the first protocol of the second radio access scheme;

a selector unit configured to select, in the procedure, a security processing algorithm of a second protocol of the second radio access scheme used in a communication between the mobile station and the radio base station of the second radio access scheme, based on the security processing capability of the mobile station in the second radio access scheme; and a transmitter unit configured to transmit to the switching center of the second radio access scheme, in the procedure, a handover request acknowledge message including a transparent container including the processing algorithm of the second protocol of the second radio access scheme selected by the selector unit and the security processing algorithm of the first protocol of the second radio access scheme and the security processing parameter of the first protocol of the second radio access scheme.

* * * * *